United States Patent [19]

Price, Jr.

[11] 4,125,049
[45] * Nov. 14, 1978

[54] LATERALLY ENGAGEABLE AND RELEASABLE NUT ASSEMBLY FOR THREADED SHAFTS

[76] Inventor: Ellie E. Price, Jr., Charlotte, N.C.

[*] Notice: The portion of the term of this patent subsequent to Sep. 20, 1994, has been disclaimed.

[21] Appl. No.: 832,955

[22] Filed: Sep. 13, 1977

Related U.S. Application Data

[63] Continuation-in-part of Ser. No. 684,486, May 10, 1976, Pat. No. 4,048,897.

[51] Int. Cl.² .............................................. F16B 37/08
[52] U.S. Cl. .................................... 85/33; 74/424.8 A
[58] Field of Search ................................. 85/32 V, 33; 74/424.8 A; 269/173, 174, 175, 176, 177, 181, 182, 183

[56] References Cited

U.S. PATENT DOCUMENTS

| | | | |
|---|---|---|---|
| 463,301 | 11/1891 | Brander | 74/424.8 A |
| 721,023 | 2/1903 | Gosper | 74/424.8 A X |
| 844,469 | 2/1907 | Prouty | 74/424.8 A |
| 1,106,096 | 8/1914 | Hunt | 269/182 |
| 1,722,783 | 7/1929 | Basseches | 85/32 V X |
| 1,879,421 | 9/1932 | Nalle | 85/33 UX |
| 2,153,474 | 4/1939 | Naylor et al. | 24/135 N |
| 2,355,679 | 8/1944 | Roxs et al. | 85/83 |
| 2,736,227 | 2/1956 | Stroble | 85/33 |
| 3,343,440 | 9/1967 | Jones et al. | 85/33 |
| 3,431,623 | 3/1969 | Smeets | 85/33 X |

FOREIGN PATENT DOCUMENTS

| | | | |
|---|---|---|---|
| 830,717 | 1/1952 | Fed. Rep. of Germany | 85/33 |
| 30,851 | 3/1970 | Japan | 85/33 |

Primary Examiner—Thomas J. Holko
Attorney, Agent, or Firm—Robert Brown, Jr.

[57] ABSTRACT

A nut assembly for threaded shafts capable of being quickly released from threaded engagement with a shaft, and then moved longitudinally to a selected position on and re-engaged with the shaft. The assembly is characterized by a pair of collar members respectively mounted for relative rotation about fixed parallel axes so as to provide an opening between opposing peripheral segments thereof for receiving the shaft. The inner periphery of one of the members is threaded at the opening and the inner periphery of the other member is provided with a cam surface responsive to said relative rotation for laterally pressing the shaft into threaded engagement with the opposing collar member.

5 Claims, 10 Drawing Figures

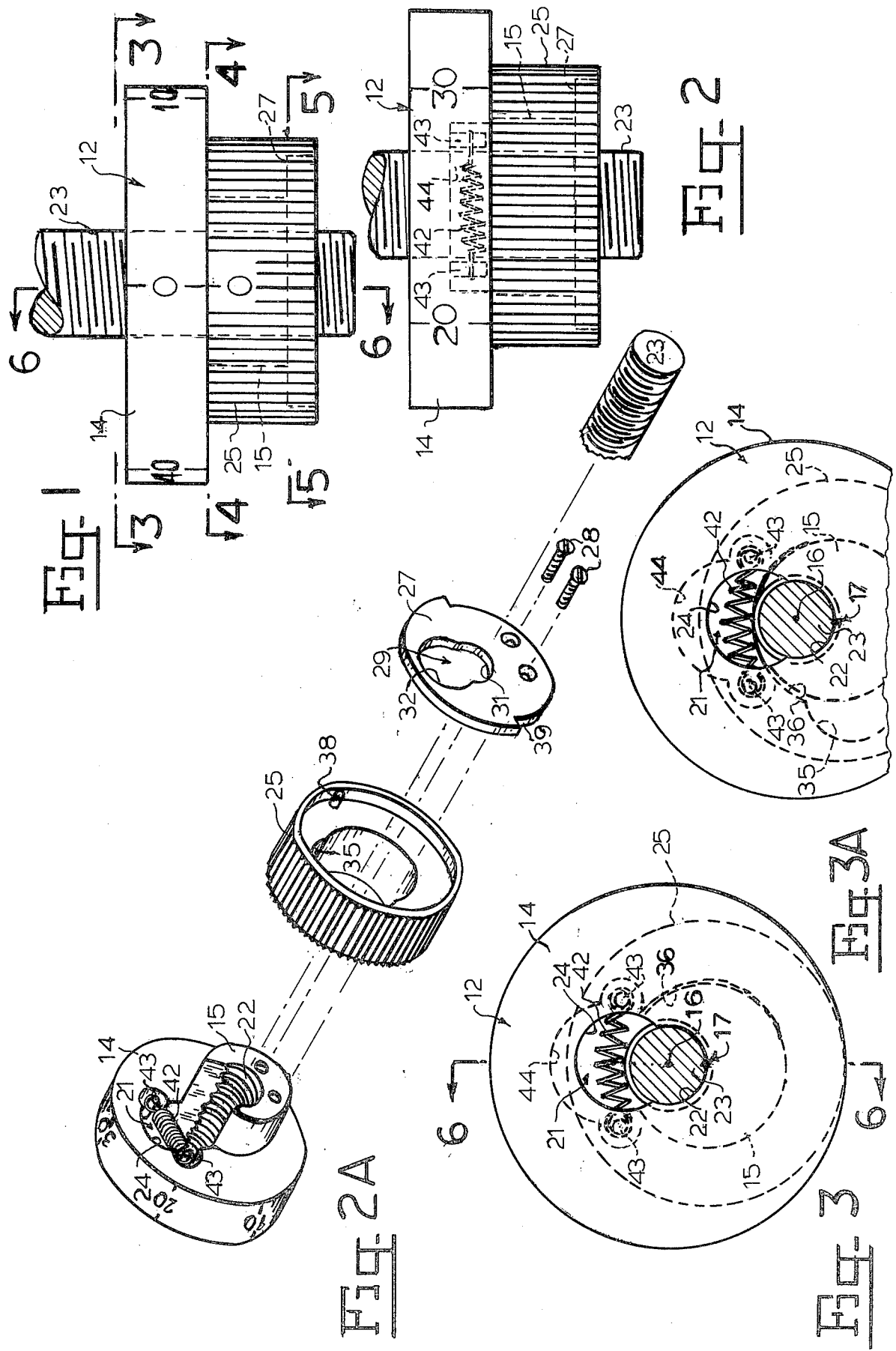

LATERALLY ENGAGEABLE AND RELEASABLE NUT ASSEMBLY FOR THREADED SHAFTS

This invention is a continuation-in-part of my patent application Ser. No. 684,486 filed May 10, 1976, now U.S. Pat. No. 4,048,897 and more especially to a laterally engageable and releasable nut assembly for threaded shafts.

Heretofore numerous types nut assemblies have been provided to cause a nut and shaft to be laterally held in, or released from, threaded engagement with a shaft. The Prouty U.S. Pat. No. 844,469, Hunt U.S. Pat. No. 1,106,096, Nalle U.S. Pat. No. 1,879,421 and Stroble U.S. Pat. No. 2,736,227 are examples of such devices. Such devices has not proved to be generally satisfactory due, in part, to the intricate and expensive construction which unreasonably increased production and maintenance costs.

It is therefore an object of this invention to provide a nut assembly which will obviate the aforementioned drawbacks in prior art construction.

It is another object of this invention to provide a nut assembly of the class described which is insertable endwise upon a threaded shaft and confined thereon either in locked threaded engagement, or in relatively rotatable threaded engagement, or in a threadably disengaged position permitting the assembly to be moved freely along the shaft.

It is further object of this invention to provide a nut assembly comprised of a pair of peripherally continuous collar members rotatably mounted upon one another about spaced parallel axes to provide an opening between opposing inner peripheral segments of the collars for receiving a threaded shaft, in combination with a cam surface on one of the collar members and responsive to relative rotation of the members for releasably holding the shaft in threaded engagement with the opposing collar segment.

It is yet another object of this invention to provide a quick acting stop nut assembly of the type described which is of unique construction, highly efficient in operation, composed of few parts, and relatively inexpensive to manufacture.

Some of the objects of invention having been stated, other objects will appear as the description proceeds when taken in connection with the accompanying drawings, in which,-

FIG. 1 is a front elevation of my improved nut assembly mounted upon a theaded shaft;

FIG. 2 is a rear elevation of FIG. 1;

FIG. 2A is an exploded isometric view of FIG. 2, looking upwardly at an acute angle to the shaft axis;

FIG. 3 is a sectional plan view taken along line 3—3 in FIG. 1, showing the nut yieldingly confined in unlocked lateral threaded engagement with the shaft;

FIG. 3A is a view similar to FIG. 3, but showing the nut and shaft rigidly locked together in lateral threaded engagement;

Figure 6:
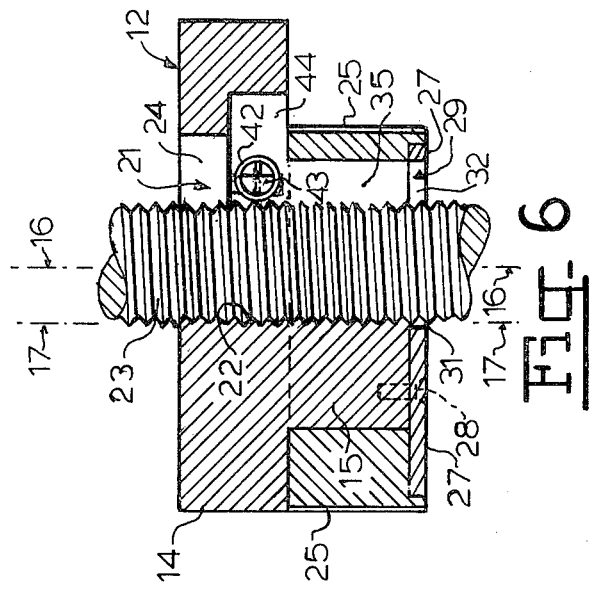
FIG. 6 is a vertical sectional view taken along lines 6—6 in FIGS. 3 and 4.

Referring more particularly to the drawings, the numeral 12 broadly denotes a nut assembly comprising a cylindrical collar member 14 having integral with the lower face thereof a relatively smaller cylindrical projection 15. The outer peripheries of the cylindrical components 14 and 15 are generated respectively about spaced parallel vertical axes 16 and 17 (FIGS. 3, 3A, 4, 4A and 5). Assembly 12 has a slot or opening 21 extending laterally outwardly from its central portion, the inner end portion of the opening consisting of a threaded bore 22 adapted to receive a threaded shaft 23, and the outer end portion consisting of an enlarged smooth bore 24 adapted to loosely receive the shaft when threadably disengaged as described more fully hereinafter.

A collar member or cam ring 25 is rotatably confined upon projection 15 by means of a retainer plate 27 which is attached to the lower face of the projection by screws 28. The plate 27 has an opening 29 therein composed of a smooth inner bore segment 31 and a relatively larger smooth outer bore segment 32, the inner segment 31 substantially coinciding with the threaded inner bore 22 of collar member 14 thereabove and the outer bore segment 32 substantially coinciding with the outer bore 24 of the collar member (FIG. 6).

As best seen in FIGS. 3, 3A, 4, 4A, and 6, the ring 25 rotates about axis 17 in a path surrounding shaft 23 when the latter is threadably engaged with segment 31. Thus, the opening 21, which forms the inner periphery of collar member 14, overlaps the inner periphery of cam ring 25 sufficiently to accommodate shaft 23 therebetween.

It will also be observed that the inner periphery of ring 25 is provided with a notch 35 and an adjacent cam surface 36, said notch substantially coinciding with bore segments 24 and 32 of member 14 and plate 27 respectively when the shaft 23 is in releasably threaded engagement with segment 22 (FIG. 6), at which time, the graduation "0" on the front of collar member 14 is alined with the graduation "0" on the ring member 25 to visually indicate this particular relative position of the members. When, however, the ring 25 is rotated in a counterclockwise direction from the position shown in FIGS. 3 and 4 to that shown in FIGS. 3A and 4A, the cam surface 36 tangentially engages the threaded shaft 23 diametrically opposite the threaded bore segment 22 to lock the shaft and nut assembly 12 in a fixed position.

Figure 4A:
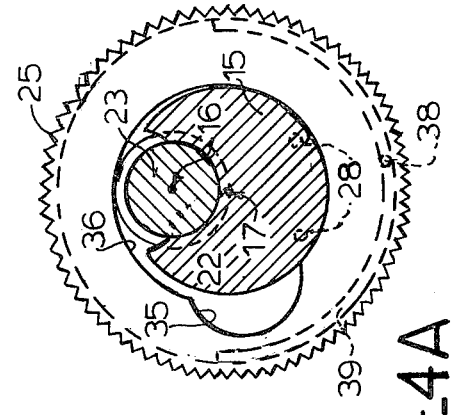
FIG. 4A is a view similar to FIG. 4, but showing the nut and shaft rigidly locked together.
Figure 4:
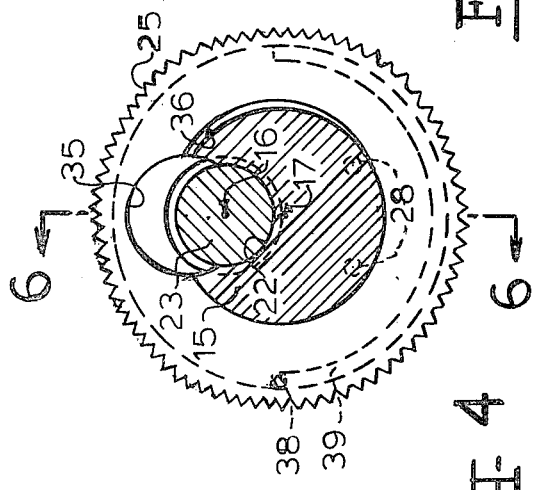
FIG. 4 is a sectional plan view taken along line 4—4 in FIG. 1.
Figure 7:
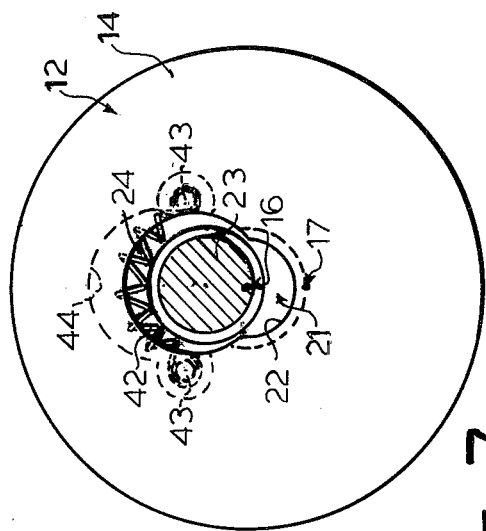
FIG. 7 is a view similar to FIG. 3, but showing the nut and shaft threadably disengaged and axially moveable relative to one another.
Figure 5:
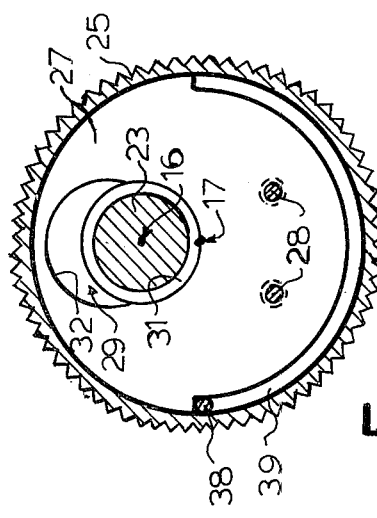
FIG. 5 is a sectional plan view taken along line 5—5 in FIG. 1.

By rotating cam ring 25 to a position intermediate the positions shown in FIGS. 4 and 4A, the assembly 12 will be confined upon shaft 23 in relatively rotatable threaded engagement.

In order to limit the clockwise rotation of ring 25 to cause notch 35 therein to coincide with smooth bore segments 24 and 32 and thereby permit the shaft 23 and nut assembly 12 to be laterally movable relative to one another, a stop pin 38 extends downwardly from the lower face of the ring and into an arcuate notch 39 in the periphery of retainer plate 27 (FIGS, 2A, 4, 4A and 5).

For certain applications, it may be desired to retain the nut assembly 12 in threaded engagement with shaft 23 when the latter is not confined by cam ring 25. This object may be attained by installing a tension spring 42 transversely of the outer bore segment 24 of opening 21 so as to yieldingly hold shaft 23 in the threaded engagement (FIGS. 1, 2, 3, 3A and 6). Spring 42 has its opposite ends connected to spaced pins 43, 43 in recess 44 of collar member 14 to thereby permit assembly 12 to be laterally released from threaded engagement at one location on the shaft, moved longitudinally to another position on the shaft, and then threadably re-engaged with the shaft. In any re-engaged position, the cam ring 25 may be rotated as above described to either confine the shaft and assembly in a relatively rotatable position, or lock them in a fixed position, or to release the shaft and assembly to permit lateral threaded disengagement.

I claim:

1. A laterally engagable and releasable nut assembly for a threaded shaft comprising a nut member having a slot extending outwardly from a central portion thereof toward its perimeter, the inner end of said slot being threaded to match the threads of said shaft and the outer slot end terminating short of said perimeter;

said slot having a width at least equal to the diameter of the shaft to permit the nut member to be laterally inserted into and removed from threaded engagement with the shaft;

a collar member mounted for rotation on said nut member, said collar member being rotatable in a path surrounding said shaft and traversing the outer portion of said slot, and cam means on said collar member responsive to said relative rotation of the members for confining said assembly in threaded engagement with said shaft.

2. The nut assembly defined in claim 1 wherein said cam means is provided on the inner periphery of said collar member.

3. The nut assembly defined in claim 2 wherein said cam means tangentially engages said threaded shaft at a point diametrically opposite said threaded engagement of the latter with said slot inner end.

4. The nut assembly defined in claim 3 wherein said cam means is responsive to the rotation of the collar member to a second position across said slot for releasing the assembly from threaded engagement with said shaft.

5. The nut assembly defined in claim 4 wherein said cam means is responsive to the rotation of the collar member to a third position across said slot for fixedly locking the assembly and shaft against relative rotation.

* * * * *